United States Patent [19]

Namdari

[11] Patent Number: 4,549,502
[45] Date of Patent: Oct. 29, 1985

[54] APPARATUS FOR WASHING ANIMALS

[76] Inventor: Bahram Namdari, P.O. Box 17366, Milwaukee, Wis. 53217

[21] Appl. No.: 369,919

[22] Filed: Apr. 19, 1982

[51] Int. Cl.⁴ .............................................. A01K 13/00
[52] U.S. Cl. .................................................... 119/158
[58] Field of Search ................ 119/158, 159; 401/198

[56] References Cited

U.S. PATENT DOCUMENTS

| | | | |
|---|---|---|---|
| 3,023,734 | 3/1962 | Schaub | 119/158 X |
| 3,267,903 | 8/1966 | Valentine | 119/159 X |
| 3,749,064 | 7/1973 | Weinstein et al. | 119/158 |
| 3,884,191 | 5/1975 | Stout | 119/158 |
| 4,020,796 | 5/1977 | Grifa | 119/158 |
| 4,083,328 | 4/1978 | Baker | 119/158 |
| 4,306,819 | 12/1981 | Schüsseler | 401/198 |

Primary Examiner—Hugh R. Chamblee
Attorney, Agent, or Firm—Andrus, Sceales, Starke & Sawall

[57] ABSTRACT

Apparatus for washing animals, such as dogs, cats, or even livestock, includes an enclosure in which the animal can be restrained with only its head extending therefrom; a plurality of spray heads located within the enclosure; a plurality of adjustably positionable and movable brushes located within the enclosure; mechanism for supplying warm water to the spray heads, and for subsequently supplying drying air to the same spray heads; and mechanism for moving the brushes to effect gentle scrubbing of the animal.

8 Claims, 21 Drawing Figures

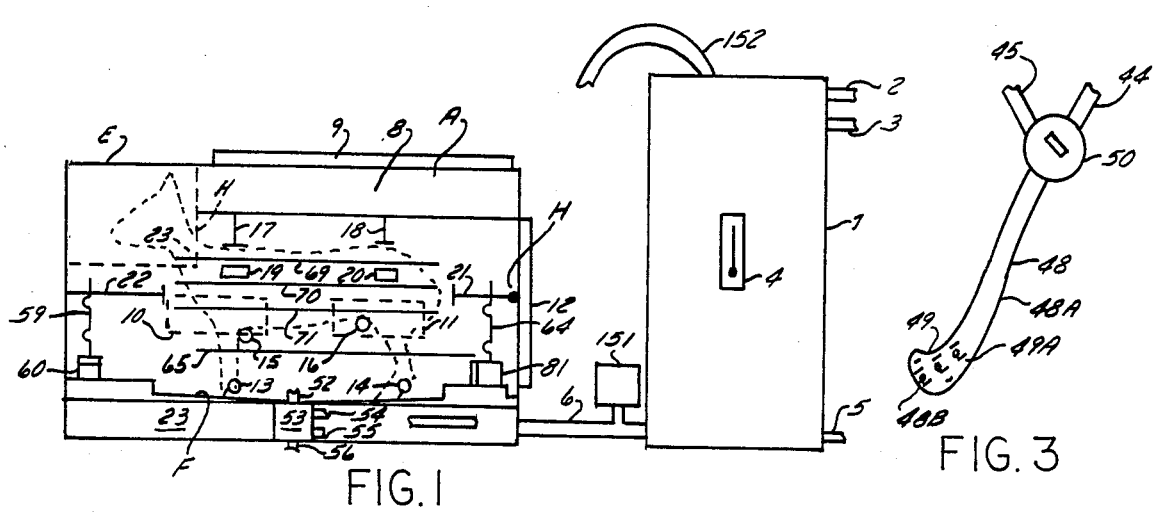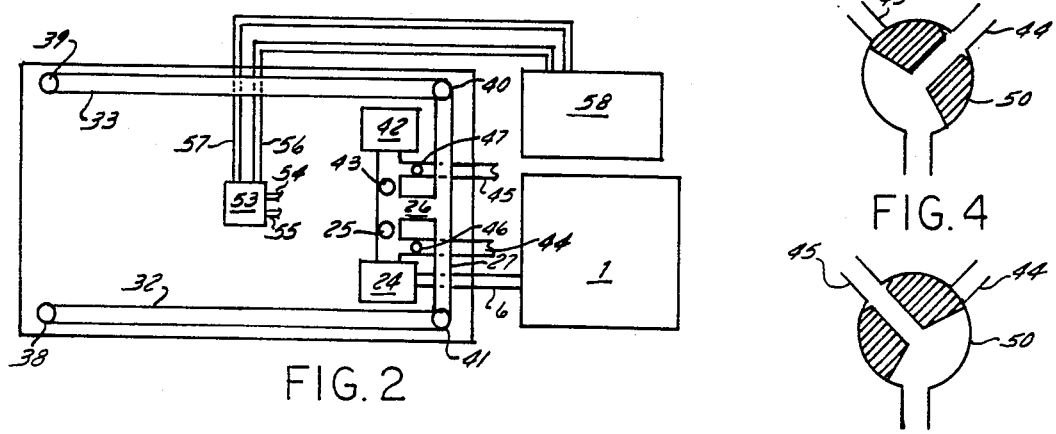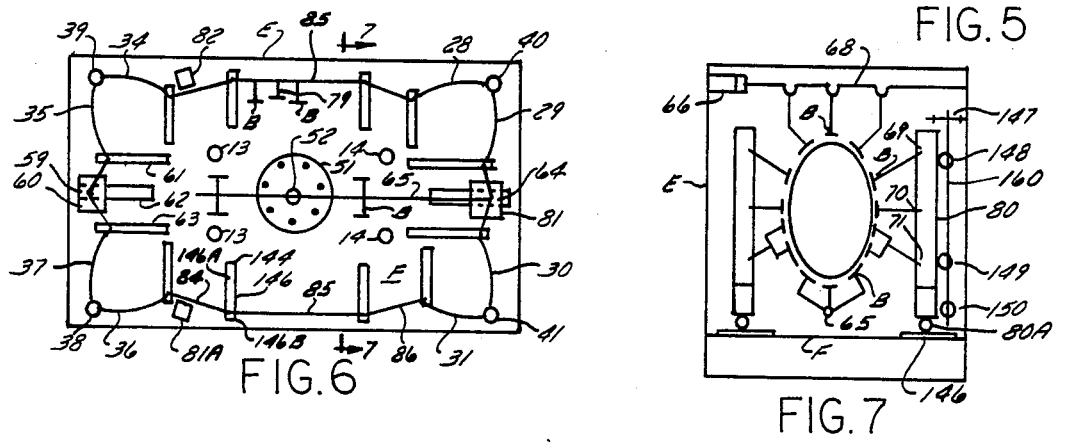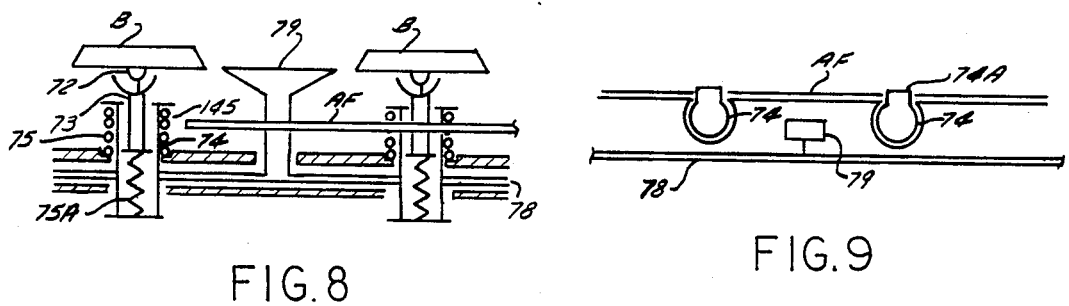

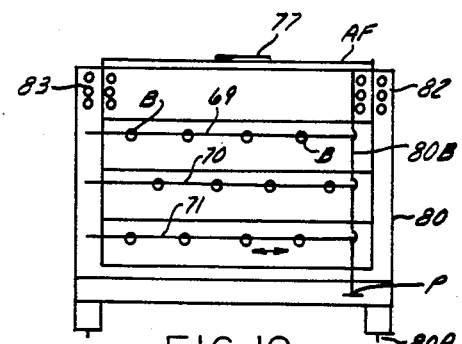
FIG. 12
FIG. 10
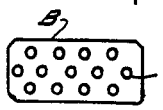
FIG. 14
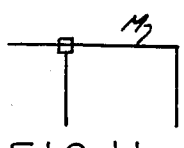
FIG. 11
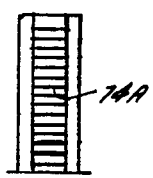
FIG. 13
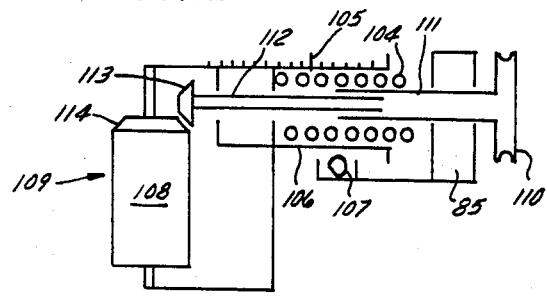
FIG. 15
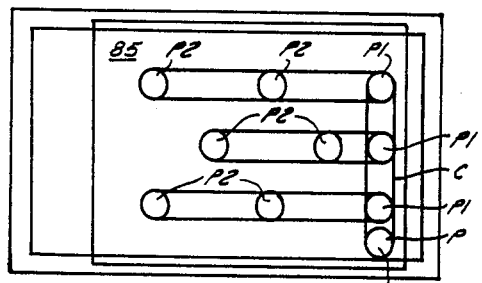
FIG. 16
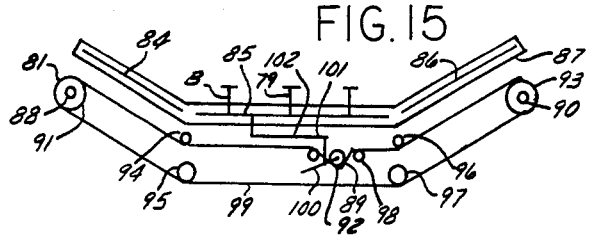
FIG. 17
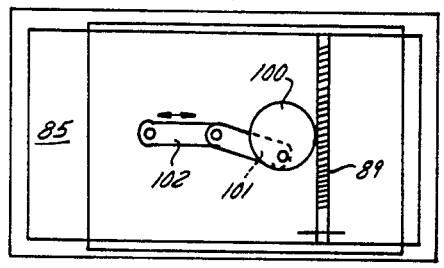
FIG. 18
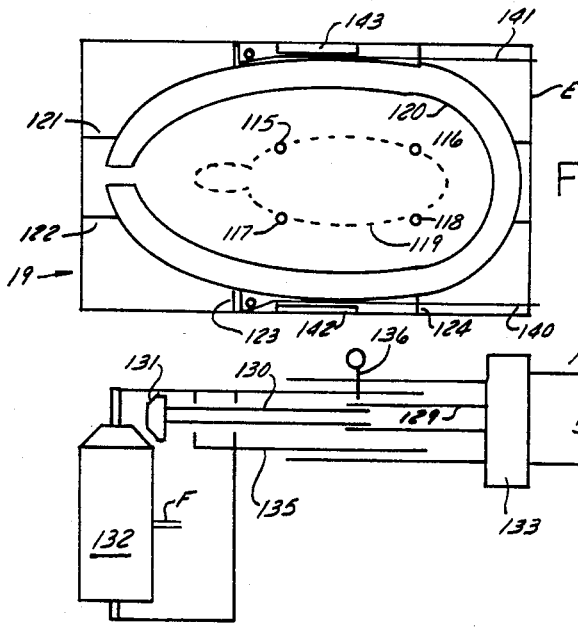
FIG. 19
FIG. 20
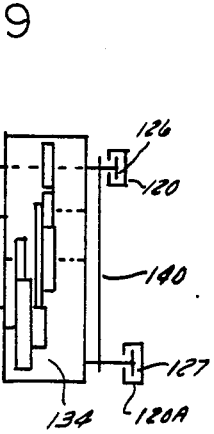
FIG. 21

4,549,502

APPARATUS FOR WASHING ANIMALS

BACKGROUND OF THE INVENTION

1. Field of Use

This invention relates generally to apparatus for washing animals, such as pets and livestock and particularly to such apparatus which includes an animal-receiving enclosure having liquid spraying nozzles therewithin.

2. Description of the Prior Art

Presently, small animals such as dogs and cats are usually washed by hand either at home or at pet grooming shops. At home, washing is usually done in the bath tub, but this is time-consuming, difficult and unpleasant. Restraining the animal is difficult and the animal shakes itself and wets the surrounding area and the person doing the cleaning. Cleaning animals in a grooming shop is expensive and it is not practical to do this very often. Consequently, pets such as dogs aren't cleaned frequently and remain dirty, smelly and quite unpleasant to persons near them.

The prior art discloses several types of apparatus for washing animals, such as pets and livestock, and the following U.S. Pat. Nos. illustrate the state of the art: 4,083,328; 4,057,032; 4,056,078; 3,941,092; 3,884,191; 3,263,653; 3,023,734; 2,611,341; 2,536,943; and 2,438,979.

Several of these patents disclose rigid or flexible housings or enclosures wherein the animal is restrained with only its head protruding. Some also show mechanisms including spray heads in the enclosure, for directing liquid cleansing solutions and/or drying air at the animal. Some further show access openings in the enclosure whereby the person cleaning the animal can insert his or her hands or a scrub brush to exert a scrubbing action on the animal.

Such prior art apparatus still requires a lot of effort and movement and is time consuming and tiresome to use. It still requires exercise of incomplete and difficult methods, such the same as if the animal were still washed in the bathtub. Except for a better way of confining the animal, the prior art apparatus does not appear to encourage the owner to wash the animal more frequently and keep them clean.

SUMMARY OF THE PRESENT INVENTION

In accordance with the present invention there is provided improved animal washing apparatus that encourages animal owners to pay more attention to the cleaning and hygiene of the animals and, consequently, to the hygiene of themsevles and their families. The apparatus does a very high percentage of the work automatically and in a very short time on the order of only a few minutes.

The apparatus includes several mechanism that wash the animal gently, as if it were done with the tip of the fingers, and that operate in a matter of a few minutes so that washing an animal is not time-consuming, unpleasant, and exhausting to the attendant and does not allow the surroundings and the attendant to get sprayed and dirty. Also, the apparatus prevents the animal from running away and thereby cause exhausting attempts by the owner to restrain it. Since washing the animal is so easily, rapidly and virtually automatically done, washing the animal becomes a simple and routine procedure. Thus, animals are washed frequently so that the animal looks and feels better. Through better hygiene the animal remains healthier and there is less chance of endangering the health of the owners. The apparatus is suited to become a common household item for the pet owners, such as conventional dishwashers or clothes washing machines are. The apparatus can be manufactured according to the size of the animal, and can be built for small sized animals, such as cats and dogs, or for large sized animals such as horses or cattle. The smaller sized apparatus is suited to be installed in a laundry room, since the water supply connection and drainage system are the same as present domestic appliances. The apparatus can be designed to fit animals of relatively the same size, with the differences of up to several inches in side being accounted for. Since means are provided to adjust the brushes to the contour and size of the animals, an owner of a Yorkshire Terrier would buy apparatus that fits the size of such a small dog, and an owner of a Great Dane would buy a unit of larger size.

Other objects and advantages of the invention will hereinafter appear.

THE DRAWINGS

FIG. 1 is a schematic side elevation view with portions broken away of a first embodiment of apparatus for washing animals in accordance with the present invention;

FIG. 2 is a top plan view of the apparatus of FIG. 1 and showing the lower portion of the enclosure;

FIG. 3 is an enlarged view, partly schematic, of a manually operable brush useable with the apparatus of FIG. 1;

FIGS. 4 and 5 are enlarged, schematic views of the valve of the brush of FIG. 3 and showing the valve in various positions;

FIG. 6 is a top plan view showing the upper portion of the enclosure of FIG. 1;

FIG. 7 is a cross-section view taken on line 7—7 of FIG. 6;

FIG. 8 is an enlarged view, partly in cross section, of two brushes and a spray head in the enclosure;

FIG. 9 is an enlarged cross-section view of portions of the brush adjusting mechanism of FIG. 13;

FIG. 10 is a schematic diagram showing brush layout for the embodiment of FIG. 1;

FIG. 11 is a plan view of measuring instrument for measuring an animal and adjusting brush position accordingly;

FIG. 12 is a side elevation view of the enclosure of FIG. 1 and showing a brush positioning mechanism;

FIG. 13 is an enlarged top plan view of a portion of the brush adjusting mechanism of FIG. 12;

FIG. 14 is an enlarged plan view of a brush shown in FIGS. 3 and 8;

FIG. 15 is a schematic side elevation view of an enclosure in accordance with a second embodiment of the invention;

FIG. 16 is a reduced side elevation view of brushes of the type used in FIG. 15;

FIG. 17 is a top plan view of a brush moving mechanism in accordance with another embodiment of the invention;

FIG. 18 is a side elevational view of a portion of the mechanism shown in FIG. 17;

FIG. 19 is a top plan view of another embodiment of the invention;

FIG. 20 is an enlarged side elevation view of a brush used in the apparatus of FIG. 19; and FIG. 21 is a top plan view of another brush used in FIG. 19.

DESCRIPTION OF PREFERRED EMBODIMENTS

General Arrangement

FIGS. 1 through 14 pertain to a first embodiment of the invention employing non-rotatable reciprocably movable brushes. FIGS. 15 through 18 to a second embodiment of the invention employing stationarily positioned rotatable roller type brushes. FIGS. 19 through 21 pertain to a third embodiment of the invention employing longitudinally movable rotatable roller type brushes.

Apparatus in accordance with the invention generally comprises the following components and mechanism which are understood to be employed with all embodiments of the invention disclosed herein, namely: (1) an enclosure E for an animal, such enclosure having a floor F and a releasably closeable door or lid 8 for access opening A through which the animal is emplaced and removed, such enclosure also having an opening H through which the animal's head can protrude; (2) means within the enclosure E for releasably restraining the animal in a stationary position, including bars 15 and 16 and restraints 13 and 14; (3) means for supplying cleansing liquid to the enclosure E and including a mixing tank 1, a liquid pump 24, and spray heads or nozzles 79 within the enclosure E; (4) means for supplying drying air to the enclosure E and including an air pump 42 and the aforementioned spray heads 79; (5) moveable brushes B or 108 and 132 within enclosure E for contact with the animal to effect cleansing; (6) means to adjustably position the brushes in an appropriate position relative to the animal; (7) means to move the brushes against the animal to effect cleansing; (8) means including a drain 51 and a drain pump 53 and a removable rotatable spray arm (not shown) to effect cleaning of the machine after use; (9) and means including access ports 10 and 11 to enable the operator's hand or a hand-held brush such as 48 (FIG. 3) to be inserted to assist in cleaning the animal or the apparatus.

In the first embodiment, the brushes B are resiliently mounted on longitudinally movable drive rods 69, 70, 71 reciprocably movable in the horizontal direction by means of a motor 81A. Axles 59 and 64 are rotatably about the vertical axis by means of motors 60 and 81 and cause horizontal reciprocal movement of rod 65. The drive rods are mounted in support frame assemblies 80 that can be moved toward or away from the animal and releasably locked into a proper position for most effective scrubbing. Motor 81A through pulley and belt run each one of three segments independently.

In the second and third embodiment, the brushes 108 and 132 are resiliently mounted, relatively large type brushes which are rotatable about vertical axes by means of suitable belt-drive mechanism, for example. The brushes are adjustably positionable relative to the animal and releasably lockable in desired positions.

In the second embodiment, the rollers 108, once positioned, rotate about fixed vertical axes. In the third embodiment, the rollers 132 shift back and forth along the length of the animal as they rotate.

Since the cold and hot water should not be poured into the machine while the animal is in it, mixing tank reservoir 1 is necessary and is filled by the inlet cold and hot water pipes 2 and 3, respectively, and a thermostat 4 is provided to control the temperature of the water. Tank 1 has a drain outlet 5 for draining the tank after the washing has been done. Tank 1 is connected to the washing machine enclosure E by a pipe 6. The top or lid 8 of enclosure E can be removed to put the animal inside the enclosure. The top of lid 8 has another lid 9 that can be opened for allowing the hosing down and washing of the brushes and movable parts to free them from the hairs and debris of the animal after the animal has been washed and removed. The enclosure E has several access ports such as 10 and 11. A door 12 is provided in the back of enclosure E for letting the animal into the enclosure for cleaning if this way is preferred, although such a door could be located on the front or sides of the enclosure. All of the doors and access ports are watertight when they are closed to prevent messing up the floor and the surroundings.

After the animal is put in enclosure E it should be immobilized as much as possible to enable proper washing. For this purpose several straps and restraints are provided such as pairs of straps 13 and 14 for keeping the animal's feet in the proper place. Also, the bars or restraints 15 and 16 prevent the animal from sitting down or moving forward or backwards. Further restraints or abutments 17 and 18 for the bony area of the shoulders and back will further immobilize the animal and abutments or stoppers 19 and 20 and their corresponding stoppers on the other side of the animal will prevent the animal from moving sideways. A stopper 21 that is located below the tail at the hip portion will prevent the animal from moving backwards and a stopper 22 will not allow the animal to go forward. A watertight collar 23 for opening H will prevent water from getting out of the enclosure from around the animal's neck where the head and neck of the animal protrudes out of the enclosure E.

The floor F of enclosure E is inclined toward the center for proper drainage and the drain pump 53 and piping therefor is located underneath floor F in a space 23.

Referring to FIG. 2, which is a top view of space 23, some of the other components in space 23 are shown. Although some of the water valves in the system can be solenoid-operated by timers or automatically, since the operator has to attend the animal during washing, it is safer and preferred to operate these solenoid-operated water valves and water and air pumps by means of manually operable individual switches to prevent any kind of harm to the animal.

A water pump 24 pumps heated water from reservoir 1 and, after a valve 25 is opened, directs the water through a pipe 26 to a pipe 27. Pipes 26 and 27 are connected to vertical pipes 40 and 41 which penetrate the floor F of the enclosure E. Flexible hoses 28, 29, 30 and 31 connect pipes 40 and 41 to the proper shower or spray heads or nozzles 79. Pipes 26, 27 connect through pipes 32, 33, respectively, to the two other corner pipes 38 and 39 which penetrate upward vertically through floor F to connect to flexible pipes 34, 35 and 36, 37 to provide water to additional shower heads 79.

An air pump 42 with a heating element (not shown) is provided. After the animal has been washed and after valve 25 has been closed, a valve 43 will open and allow warm air to pass through the same pipes above-described to the shower heads to blow at and dry the animal.

As FIG. 2 shows, a pipe 44 connects to water supply pump 24 and a pipe 45 connects to the warm air supply pump 42. Pipes 44 and 45 have control valves 46 and 47, respectively, which, if the operator desires to use the manual brush 48 of FIG. 3, they are connectable to the hand brush 48 for scrubbing and/or drying some areas of the body of the animal that cannot be washed and dried automatically by the apparatus. Brush 48 has a semi-firm bendable arm or handle 48A that can be bent by the operator as he sees proper to reach those areas through access ports such as 10 and 11. Handle 48A has a head 49 at one end that is like the rest of the brushes B, hereinafter described, that are located inside of enclosure E. Although the bristles 49A of brush 48 (and brush B hereinafter described) can be made of different materials such as plastic or metal with different firmness and different lengths and sizes of bristles, apparatus that cleans as gently as if it were done with the hand and tips of the fingers should comprise brushes made of a relatively soft but durable rubber with projections as wide as tips of the fingers, i.e., as FIG. 14 shows, probably about one centimeter in diameter and 0.3 centimeter high and spaced about ½ centimeter apart from each other. However, these dimentions can vary according to the size of the animal and the length of the hair and other variable conditions. Head 49 has many small holes 48B between its bristles 49A for allowing the water and warm air to pass through. The brush 48 has an inner semi-rigid core for proper function. The other end of brush handle 48A has a selector valve 50, shown in FIGS. 3, 4 and 5 that allows either water or warm air, according to valve position, to emerge from the head. The water and the air cannot be mixed, and this is a safety measure to protect the pumps 24 and 42.

FIG. 6 shows a top plan view of the area in enclosure E, above floor F, in which the animal is washed. Floor F has a central drain 51 which is on the axis 52 of pump 53 shown in FIGS. 1 and 2. Pump 53 preferably is of the same type as is used in domestic dishwashers and is provided with the same characteristic features. Pump 53 is used to clean the enclosure E of hair and debris of the animal after the animal has been washed and removed. Pump 53 has a spray arm (not shown) that is removed when the animal is in the enclosure E so that accidental rotation will not injure the animal. A spray arm (not shown) can also be installed in the upper part of the enclosure E like in some dishwashers to completely wash the different parts of the interior. Pump 53 has its own separate inlet water supply lines, warm and cold lines 54 and 55, respectively, and its own draining system 56 that can be drained into a home drain system. When pump 53 is cycling and spraying water around, it is preferred that at the same time water via pipe 56 and 57 be filtered through a filter 58 and returned to the enclosure E so that as much hair and debris are removed as possible. Since the interior of enclosure E has many different projections, removing the hair and debris in this manner will help in cleaning those parts much more easily. Filter 58 can simply be a strainer (not shown) placed inside a container (not shown), and water from pipe 56 will pour into the strainer wherein hair and debris are filtered out and the water is picked up by pipe 57 and returned into the enclosure E. Other kinds of filters can be used, if desired.

Referring to FIGS. 1 and 7, the lines 65, 69, 70, 71 are brush support rods that are located in the side, front and back of the animal. The rods 69, 70, 71 are mounted on frame assemblies 80 that move on wheels 80A on roller guides 146 toward and away from the animals. A front element 59 is provided that is driven by a motor 60 and moves on roller guides 61, 62, 63. As is shown in FIG. 1, motor 60 is elevated from the floor F so that hair and debris do not trap anywhere and automatic cleaning of the machine at the end is practical. In the same manner, a rear element 64 is provided that has its own motor 81 (with reducing gears, not shown). As is shown in FIGS. 1 and 6, motor 81 runs both the back brushes B and also rod 65 that is located between the legs of the animal and its brushes B will run the undersurface of the abdomen and the inner part of the legs. If desired, this portion of the animal can be cleaned either manually with a glove or with the portable brush 48 as described in connection with FIG. 3.

FIG. 7 shows a cross section of the apparatus taken on line 7—7 of FIG. 1. FIG. 7 shows the brushes B that are used for scrubbing the back of the animal and which are located on the upper lid of the apparatus and these are run by a motor 66 with its reducing gear (not shown) and axle 68.

FIG. 8 shows an enlargement of a group of two adjacent brushes B and an associated shower head 79 that are located on a brush support rod, such as 65, 69, 70, 71. Rod spacing is chosen according to the size of the animal. Three rods that are located on the left side of the animal in FIG. 1 are designated as 69, 70 and 71. These rods move reciprocably and horizontally for a short distance that is longer than the length of each brush so that with each reciprocal movement there is slight overlapping of the area where two adjacent brushes B on the same rod has scrubbed. Also, as is shown in FIG. 10, the brushes B of two adjacent rods can be made to slightly overlap by choosing a distance between the two rods which is slightly shorter than the width of each brush, so no area will remain unscrubbed. The brushes B move very slowly, each reciprocating movement taking a few seconds. The shape of the brush B as was described and slow movement reproduce the same action as if a person were using his fingers for scrubbing the back. It is very gentle to the animal. Because all of this brushing is done simultaneously and probably not more than 20 or 30 seconds of such movement is necessary for completing the brushing and cleaning the animal, no more than a minute or two is spent for the entire cleaning operation and here is the principle that saves a tremendous amount of the time and effort by the cleaner.

Besides slow motion, a few other factors help to achieve gentle scrubbing. The periphery of the brush B is rounded and does not have any sharp edges to injure the animal. Also as FIG. 8 shows each brush B moves a few degrees around an axis 72, in the direction of the movement so that the brush moves according to the contour of the body. Furthermore, a safety feature is the movement of the entire brush B inwardly along axis 73 in cylinder 74. The brush B is biased outwardly by a spring 75A. Spring 75 should be a soft, flexible spring to keep gentle but sufficient pressure of the brush B against the animal's body, but with a change in contour, the brush easily moves in and does not harm the animal.

Another factor that helps achieve efficiency and comfort is provision of means to adjust the position of brush holding cylinder 74 in relation to the contour of the body of the animal. The brushes B are located in such a way that in their cross section arrangement at each given plane they resemble the shape of the cross section of the animal at that plane (see FIG. 7). Preferably, this is achieved by an adjustable dummy of an animal that the owner will purchase and is sized according to the species of the animal that he intends to wash. By using a measuring instrument M such as shown in FIG. 11, measurements are made of the different areas of the animal body and the dummy is adjusted so that it is the size of the animal. The dummy is put in the enclosure E where the animal will stand and then, by pulling a handle 77 of FIG. 12, releases all of the brushes in that group by pulling upward on a frame AF which is shown in FIG. 12. As FIGS. 9 and 13 show, this will disengage the securing member 74B from the toothed area 74A of the top of cylinder 74. Then cylinder 74 moves forward by the action of spring 75 and stops when brush B has touched the body of the dummy. As handle 77 is released, all of the brushes B are locked in a position that accommodates the shape of the animal. FIG. 14 shows the surface of a brush B. FIG. 8 shows a water line 78 that runs under cylinders 74, as is shown in FIG. 9, and which provides water or warm air to the shower head 79.

The movement of the brushes B can be achieved by moving the brushes in each support frame 84, 85, 86 together by a common driven pulley P as is shown in FIG. 12. A group of pulleys (not shown) are driven by common motor for the 3 segments of left group. Other motors drive the right group, the front row, and the rear group. It is to be understood that this creates a reciprocal movement of the brushes B and shower heads 79 together. FIG. 12 shows the springs 82 and 83 that keep the rod support frame down against the cylinders.

This reciprocal movement can be achieved in another way, as is shown in FIG. 17 and FIG. 18. The brushes B of each segment are fixed with the shower head 79 in different rows on a solid member 85 and that solid member 85 moves in another frame 87 as shown in FIG. 17. For example, in FIG. 17 these frames 87 are connected but the members 84, 85 and 86 that contain the brushes B are not connected and each one moves separately in frame 87, preferably on a roller for ease of movement. These movable frames are numbered 84, 85, 86 and the surrounding frame is designated by the number 87. As FIGS. 17 and 18 show, a common motor like 81 moves the screws 88, 89, 90 and these screws are run through pulleys 91, 92, 93 and the guiderails 94, 95, 96, 97, 98 and the belt or chain 99. Each segment 85, for example, moves in reciprocating movement after the screw 89 drives a worm gear 100 and, as is apparent, this, acting through the arms 101 and 102, moves the segment 85 and the brushes B back and forth.

The kind of brush B that was hereinbefore described is used in a preferred embodiment of the invention. In the following description, two other embodiments of the invention are described. Instead of non-rotatable brushes B, rotary cylindrical brushes 108 or 132 with numerous soft bristles or fibers F can be employed to gently brush the body of the animal as the cylinder rotates. A mechanism for effecting rotation of the brushes 108 is shown in FIGS. 15 and 16. FIG. 16 shows that each segment 85 could have its own motor 103 that by its pulley P and chain or belt C moves a group of the vertically located pulleys P1 and those pulleys through secondary pulleys P2 move all of the pulleys and cylinders on that line. Then, each segment 85 according to the mechanism described in FIGS. 17 and 18 will have a reciprocating movement so it will cover the entire surface of the animal as was described for the brushes B. Here again, as FIG. 15 shows, the springs 104 after the frame 105 has been pulled up will bring the cylinder 106 outward so the cylinder will take the position that is in accordance with the contour of the animal and, after locking system 105 is released, will lock the cylinder in the position. FIG. 15 shows a supply line 107. Cylinder roller 108 has fiber bristles F. As the pulley 110 rotates, the cylinder 111 also rotates and moves shaft 112. Shaft 112 moves gears 113 and gear 114 to move cylinder 108. As is seen, cylinder 111 and 112 telescope to allow adjustment of the position of the brush 108.

The third embodiment of the invention shown in FIGS. 19, 20 and 21 can be used for larger and stronger animals, such as horses and cattle. The animal is placed in the center of the enclosure E, as FIG. 19 shows. The numerals 115, 116, 117, 118 designate the straps for securing the feet of the animal and the line 119 designates the cross section of the body of the animal to show its location. A double rail 120 that takes the shape of the body of the animal is fixed to the wall of the enclosure E in such locations as 121, 122, 123, 124 and so forth. The shape of the rail 120 remains the same for one species of animal, for example, but it can be constructed in such a way that, if the owner changes the species of the animal, the shape of the rail 120 can be changed or it can be replaced to go with the shape and size of the animal. The double rails 120 houses rollers 125, 126, shown also in FIG. 20. Also, below rail 120 is another rail 120A to house roller 127 to keep the movable parts stabilized. The rotary cylinder brush 132 with its soft bristles could be a single brush that goes 360° around the rail and then reverses its movement, or there may be two brushes 132 installed, each one operating through a 180° arc. Or, two or more brushes that are installed in a vertical line to cover areas of different height on the animal could be employed, rather than choosing a long brush to extend from the top to the bottom of the animal. In such case, each brush moves on separate rails (not shown) installed as vertically spaced parallel rails. As is shown in FIG. 20, motor 128 rotates cylinder 129 which rotates cylinder 130 and gear 131 to eventually rotate cylinder 132. Element 133 is a reduction gear box. Also, motor 128 moves a series of reduction gears 134 that eventually turn the rollers 125, 126 which move the apparatus along the rail 120. A chain or belt 140 moves roller 127 and this acts to keep the mechanism straight and in place and also helps in its movement. In this embodiment there is only one or merely a few brushes, Thus, automatic adjustment of the length of the cylinder 135 is not necessary. Adjustment can be done manually by removing pin 136 and adjusting the length of the cylinder by telescopic action and replacing the pin. Of course, this roller brush 132 and the brush 108 that was described before should preferably be provided, where necessary, with plenty of drainage facilities so dirt cannot clog and cause malfunctions, For the back of the animal a separate brush 138, shown in FIG. 21 has been devised. Motor 137 drives brush 138 through a reduction gear (not shown) and a series of rollers such as 139 and 142 are on opposite ends. These rollers move on the alternate rails 140, 141 that have been shown in FIG. 19. If desired, a brush that moves in the same manner on rails 142, 143 could be provided for brushing the underside of the abdomen and legs. Here, the heights of the rails should be adjustable to locate the brush at the proper distance from the back and the abdomen.

The drive and transmission systems that are herein described can be constructed in differently than disclosed to do the same job.

It should be noted that in the first and second embodiments of the invention, when adjusting the length of the brush cylinders 74 and 106 automatically, each unit is moved on the roller guides 146 up to a point 144, as is shown in FIG. 6 in the left-hand group of brushes, and then the handle 77 of FIG. 12 is pulled upward. In this case the cylinders 74 and 106 move forward by the action of springs 145-104 and stop according to the contour of the animal body at that point. Then, as the handle 77 or 105 is released, the locking frame will come down and lock the cylinders in position. Now, this position usually will not change and should remain the same for a long time and readjustment should not be necessary. Then, the groups of brushes are pulled back to point 146B (FIG. 6) so the brushes B will be completely out of the way to allow the animal to be placed in enclosure E. When the group of brushes B is moved to point 146A, the distance is about a third or a fourth of the length of cylinder 73 away from the point 144. At this point, as FIG. 7 shows, the locking into position can be done by means such as by vertical rods 160 that move from an anchor plate 147 attached to the wall of the enclosure E down through rings 148, 149, attached to the surface of this brush support frame 80 down to an elevated ring 150 that is attached to the floor F. At point 146A the brushes B are pressing softly against the body of the animal and cylinder 73 is half out. If the animal moves an inch or two from one side to the other side the cylinder 74 moves in and out and the brush B constantly remains in contact with the body of the animal.

Operation

The lid over one of the openings, such as the door is raised and the animal is placed in the enclosure. Its legs are strapped down and the immobilization rests are put in place. Assume that a liquid soap has already been placed in a soap container 151 and that water has been already put in tank 1 with the desired temperature. Assume that the water supply valves 2 and 3 (FIG. 1) have been closed to prevent further entrance of the water into the tank 1 to prevent a change in the temperature of the water. Air vent 152 is necessary and is connected to the sewer system to allow atmospheric pressure on the top of the water and also to drain the overflow water if this happens accidentally. If preferred, a water level switch (not shown) in the tank 1 could be provided to ring a bell (not shown) or turn on a light (not shown) to warn the user to turn the water off. Water shut-off can be done automatically. Then, by actuating a switch (not shown) pump 24 will send the soapy water through different shower heads 79 on the animal and after a short time such as a minute or so, by actuating another switch (not shown) the brushes B start scrubbing the animal. This should not take more than a minute or two and an automatic relay (not shown) can be installed to shut off the brushing mechanism in the case that the operator forgets each one of these mechanisms. Then, by actuating another switch (not shown), the pump 24 provides more water from the tank 1 and sprays it on the animal while the brushes are still moving. This will rinse the animal of soap and dirt. Then by actuating another switch (not shown) valve 25 will shut off and valve 43 opens up and subsequently the electric elements (not shown) in blower 42 become hot and shortly after the blower starts blowing warm air through the shower heads on the animal for drying. This should not take more than a few minutes. Then the animal is taken out of the enclosure E and, if it is necessary, additional styling of the fur can be done by a manual blower and comb and brush. However, prior to drying the animal it might be necessary to clean underneath the abdomen and the inner part of the legs with hand and glove or by the manual brush 48 shown in FIG. 3. After the animal has been removed, the spray arm (not shown) is installed on shaft 52 of pump 53 and this will turn the enclosure E into a self-cleaning machine. The animal cleaning function can be regulated by a timer (not shown) that automatically and subsequently can perform chosen cycles, such as for short haired or long haired animals, or animals that are clean and need a shorter cycle or those that are dirtier and need longer scrubbing.

I claim:

1. Apparatus for washing an animal comprising:
an enclosure for said animal,
said enclosure having a closeable opening for enabling placement of said animal within said enclosure,
said enclosure having an opening for protrusion of the head of said animal;
means within said enclosure for restraining said animal;
means within said enclosure for directing a cleansing liquid against said animal;
frame means within said enclosure movable relative to said enclosure between an inoperative position and an operative washing position;
means within said enclosure for effecting movement of said frame means;
a plurality of brushes within said enclosure mounted on said frame means for contact with said animal;
and means for moving said brushes relative to said frame means against said animal when said frame means is in its washing position to effect cleansing.

2. Apparatus according to claim 1 further including means within said enclosure for directing drying air against said animal.

3. Apparatus according to claim 2 wherein said means for directing said cleansing liquid includes at least one nozzle and wherein said nozzle is also employed to direct drying air against said animal.

4. Apparatus according to claims 1 or 2 or 3 further including means for adjustably positioning said brushes relative to said animal.

5. Apparatus according to claim 4 wherein at least some of said plurality of brushes are arranged in rows lengthwise of said animal and are reciprocably movable relative to said animal.

6. Apparatus for washing an animal comprising:
an enclosure for said animal,
said enclosure having a closeable opening for enabling placement of said animal within said enclosure,
said enclosure having an opening for protrusion of the head of said animal;
means within said enclosure for restraining said animal;
means within said enclosure for directing a cleansing liquid against said animal;
a plurality of brushes within said enclosure for contact with said animal at least some of said brushes are roller type brushes and wherein each brush rotates about an axis and against said animal;
means for adjustably positioning said brushes relative to said animal;
and means for moving said brushes against said animal to effect cleansing.

7. Apparatus according to claim 6 wherein said roller type brushes are also movable longitudinally relative to said animal and including means to effect such longitudinal movement.

8. Apparatus for washing an animal comprising:
an enclosure for said animal,
said enclosure having a closeable opening for enabling placement of said animal within said enclosure,
said enclosure having an opening for protrusion of the head of said animal;
means within said enclosure for restraining said animal;
means including nozzles within said enclosure for directing a cleansing liquid against said animal;
a plurality of brushes within said enclosure for contact with said animal;
means for moving said brushes against said animal to effect cleansing;
and means for supplying said cleansing liquid to said nozzles,
said means comprising a water pump within said enclosure connected to said nozzles,
and a rotatable spray arm detachably connectable to said water pump for cleaning the interior of said enclosure.

* * * * *